United States Patent
Gao et al.

(10) Patent No.: US 8,854,013 B2
(45) Date of Patent: Oct. 7, 2014

(54) SYSTEM FOR MONITORING A BATTERY CHARGER

(75) Inventors: Lijun Gao, Renton, WA (US); John M. Fifield, Kent, WA (US); George M. Roe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 603 days.

(21) Appl. No.: 13/191,672

(22) Filed: Jul. 27, 2011

(65) Prior Publication Data

US 2013/0030593 A1     Jan. 31, 2013

(51) Int. Cl.
| | |
|---|---|
| *H02J 7/04* | (2006.01) |
| *H02J 7/16* | (2006.01) |
| *B60L 11/18* | (2006.01) |
| *G06F 1/26* | (2006.01) |
| *H02J 7/00* | (2006.01) |

(52) U.S. Cl.
CPC . *G06F 1/26* (2013.01); *H02J 7/041* (2013.01); *H02J 7/0047* (2013.01); *B60L 11/184* (2013.01)
USPC ............ 320/155; 320/104; 320/107; 320/137

(58) Field of Classification Search
CPC ........ G06F 1/26; B60L 11/184; H02J 7/0047; H02J 7/041
USPC .................. 700/297–298; 320/104, 107, 137, 320/155–156
See application file for complete search history.

(56) References Cited

U.S. PATENT DOCUMENTS

| | | | |
|---|---|---|---|
| 6,593,723 B1 * | 7/2003 | Johnson ........................ | 320/113 |
| 7,693,609 B2 * | 4/2010 | Kressner et al. .............. | 700/291 |
| 8,019,483 B2 * | 9/2011 | Keefe ............................ | 700/286 |
| 8,332,078 B2 * | 12/2012 | Narel et al. ................... | 700/297 |
| 8,421,592 B1 * | 4/2013 | Gunasekara et al. ........ | 340/5.74 |
| 8,450,967 B2 * | 5/2013 | Lowenthal et al. ........... | 320/104 |
| 8,504,227 B2 * | 8/2013 | Ichishi ........................... | 701/22 |
| 8,531,162 B2 * | 9/2013 | Hafner et al. ................. | 320/137 |
| 8,583,551 B2 * | 11/2013 | Littrell et al. ................. | 705/40 |
| 2009/0062967 A1 * | 3/2009 | Kressner et al. ............. | 700/286 |

(Continued)

FOREIGN PATENT DOCUMENTS

| | | |
|---|---|---|
| WO | WO2009012018 A2 | 1/2009 |
| WO | WO2011018959 A1 | 2/2011 |
| WO | WO2013015863 A2 | 1/2013 |

OTHER PUBLICATIONS

PCT search report dated May 22, 2013 regarding application PCT/US2012/037953, international filing date May 15, 2012, applicant The Boeing Company, 8 pages.

(Continued)

*Primary Examiner* — Ramesh Patel
(74) *Attorney, Agent, or Firm* — Yee & Associates, P.C.

(57) ABSTRACT

A method and apparatus comprising a switch and a charging management module. The switch is configured to control an electrical connection between a charging device for a battery and a power source. A current flows from the power source through the charging device to the battery to charge the battery when the electrical connection is present between the charging device and the power source. The charging management module is configured to identify a period of time for charging the battery and to control the switch to electrically connect the charging device for the battery to the power source during the period of time identified for charging the battery.

20 Claims, 7 Drawing Sheets

(56) References Cited

U.S. PATENT DOCUMENTS

| | | |
|---|---|---|
| 2009/0112291 A1* | 4/2009 | Wahlstrand et al. ............ 607/61 |
| 2010/0314182 A1* | 12/2010 | Crain et al. .................... 180/60 |
| 2011/0010043 A1 | 1/2011 | Lafky |
| 2011/0016063 A1* | 1/2011 | Pollack et al. ................ 705/412 |
| 2012/0112532 A1* | 5/2012 | Kesler et al. .................. 307/9.1 |
| 2013/0147272 A1* | 6/2013 | Johnson et al. ................. 307/29 |

OTHER PUBLICATIONS

Murach, "Electric Vehicle Management Deployments", Gridpoint, pp. 1-4, http://www.gridpoint.com/UtilitySolutions/Electricvehiclemanagement/Deployments.aspx, retrieved Jun. 3, 2011.

* cited by examiner

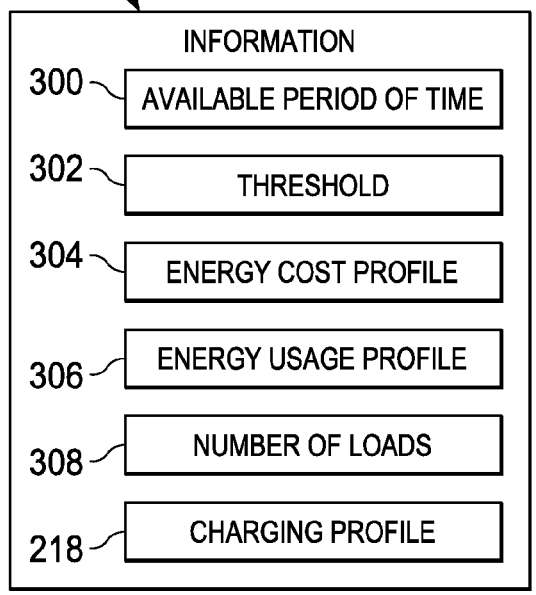
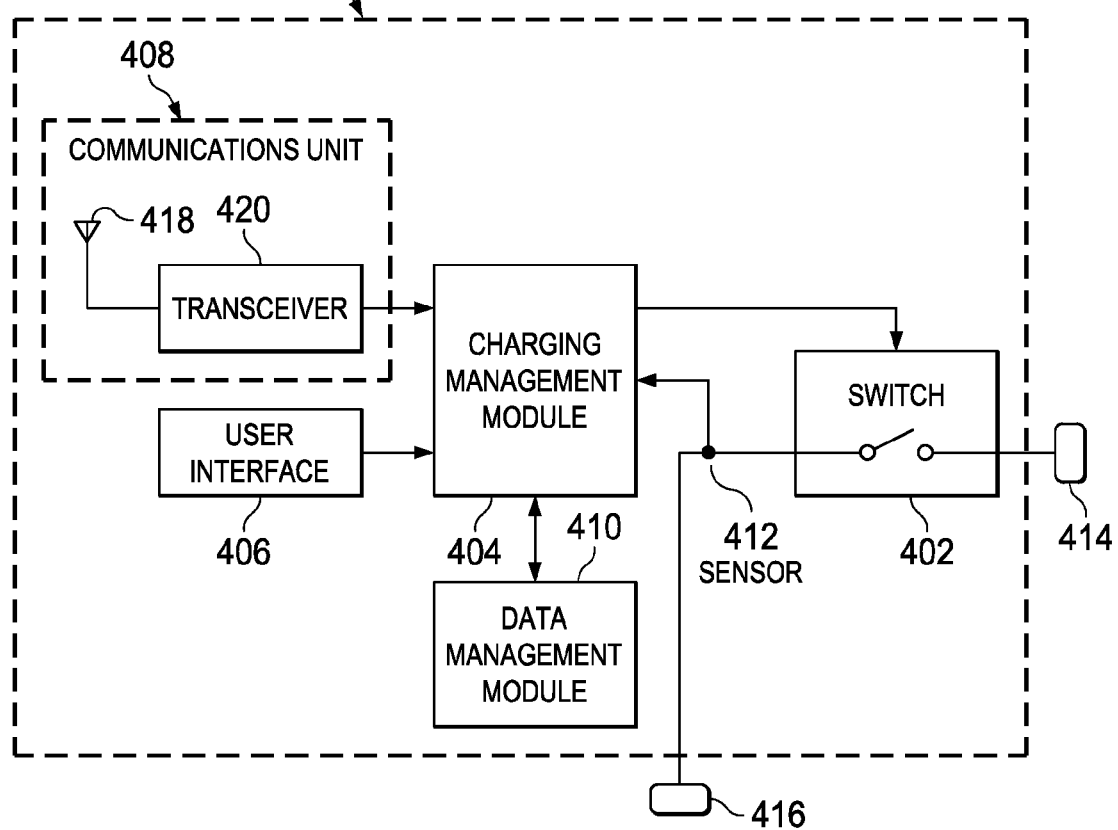

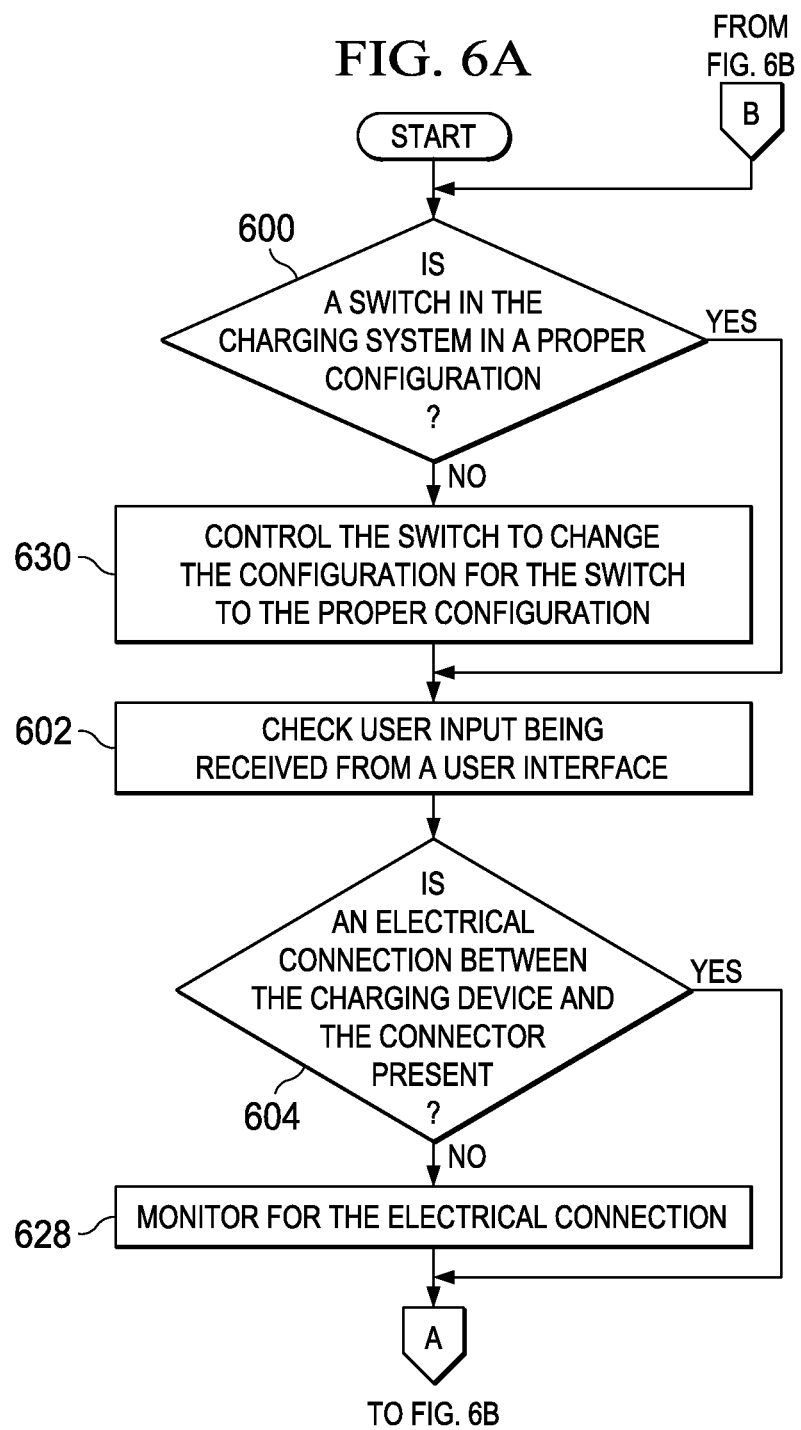

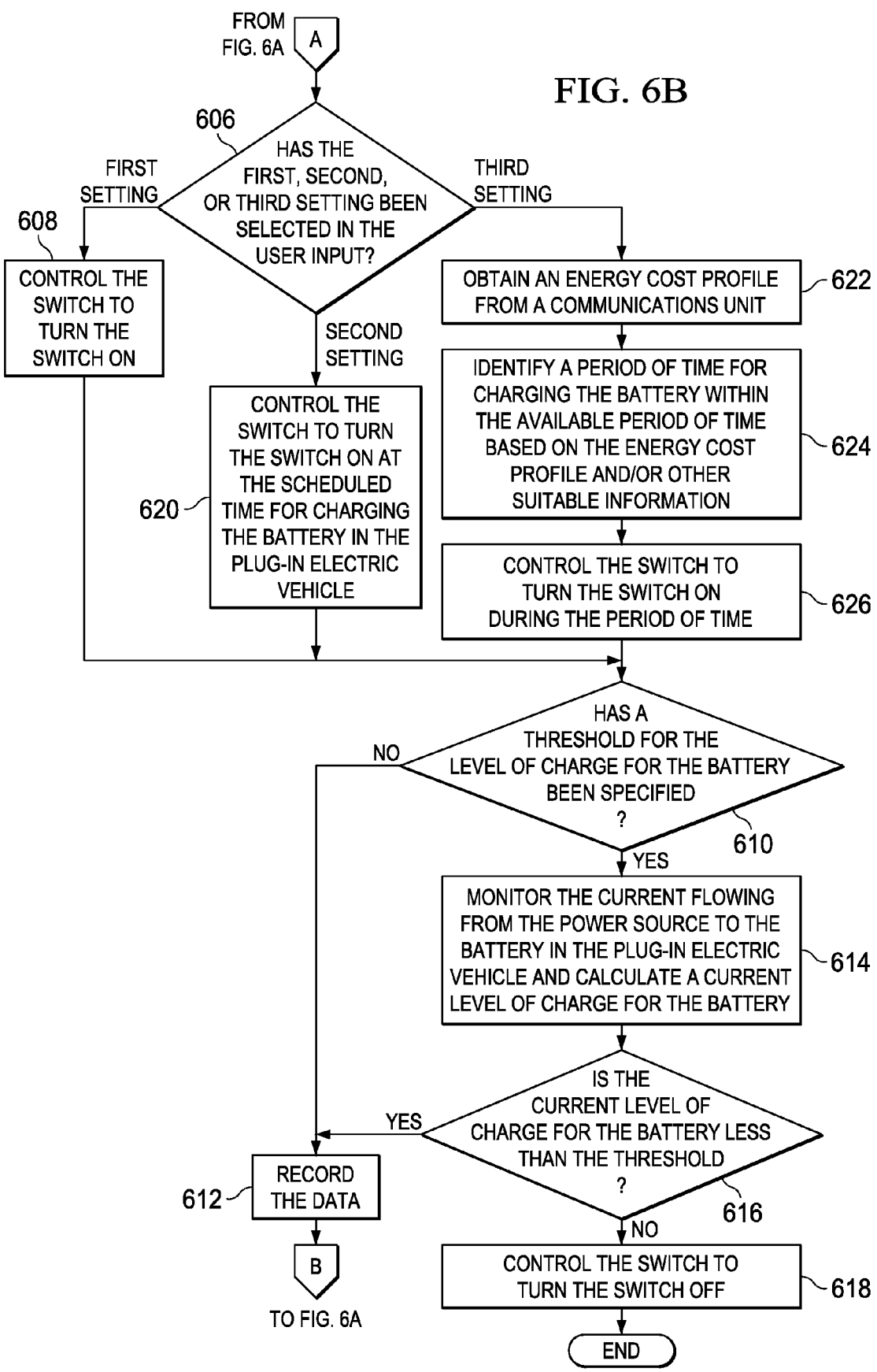

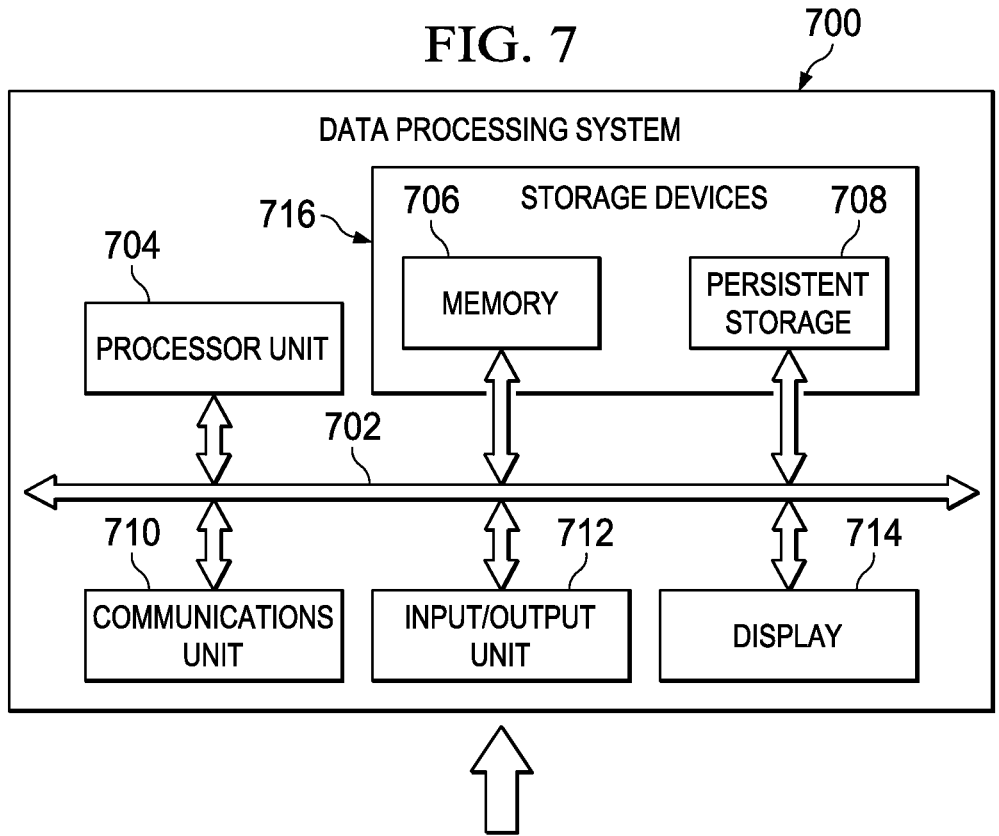
FIG. 7
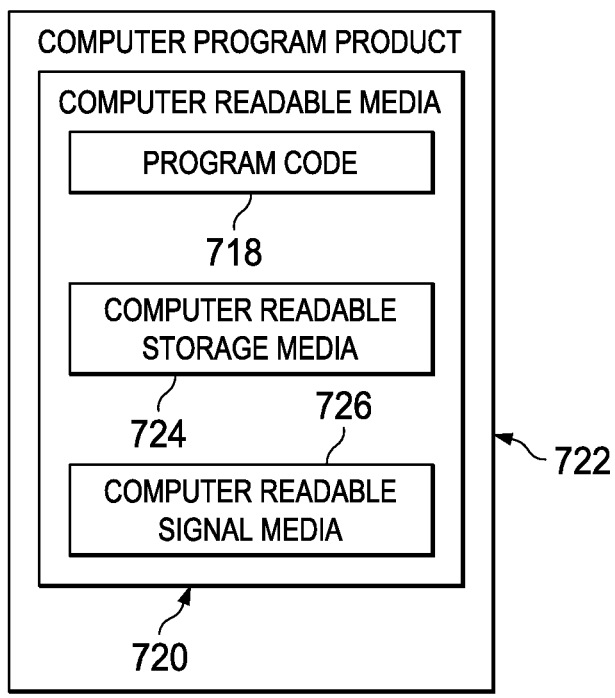

SYSTEM FOR MONITORING A BATTERY CHARGER

BACKGROUND INFORMATION

1. Field

The present disclosure relates generally to a charging device and, in particular, to a charging device for a battery for a plug-in electric vehicle (PEV). Still more particularly, the present disclosure relates to a method and apparatus for managing the amount of power consumed by a charging device for the battery in a plug-in electric vehicle.

2. Background

Many different types of devices have batteries that are rechargeable. For example, devices, such as cellular phones, laptop computers, digital cameras, personal digital assistants (PDAs), hybrid vehicles, plug-in electric vehicles (PEVs), and other types of devices may have batteries that are rechargeable. The battery for one of these types of devices may be charged by plugging the device into an electrical outlet that is electrically connected to a power source.

As one illustrative example, a plug-in electric vehicle may be plugged into an electrical outlet at a residence to charge a battery for the plug-in electric vehicle. A plug-in electric vehicle may require a greater amount of power than other types of rechargeable devices being used at the residence. As a result, the plug-in electric vehicles may increase the average amount of energy consumed by the residence during the time that the plug-in electric vehicle is being charged.

Further, as the popularity of plug-in electric vehicles increases among consumers, the total power required from a power grid for charging these plug-in electric vehicles also may increase. In other words, the load demand for the power grid may increase as an increasing number of plug-in electric vehicles are electrically connected to the power grid to charge the batteries for these plug-in electric vehicles.

For example, an increase in the number of plug-in electric vehicles electrically connected to a power grid may increase the peak-to-average ratio (PAR) of the load demand for the power grid. The peak-to-average ratio also may be referred to as the peak-to-average power ratio (PAPR). As the peak-to-average ratio increases, the quality of power being supplied from the power grid may decrease. Further, with a higher peak-to-average ratio, regulating voltage levels and managing the demand for power may be more difficult than desired.

Therefore, it would be advantageous to have a method and apparatus that takes into account at least some of the issues discussed above, as well as other possible issues.

SUMMARY

In one advantageous embodiment, an apparatus comprises a switch and a charging management module. The switch is configured to control an electrical connection between a charging device for a battery and a power source. A current flows from the power source through the charging device to the battery to charge the battery when the electrical connection is present between the charging device and the power source. The charging management module is configured to identify a period of time for charging the battery and to control the switch to electrically connect the charging device for the battery to the power source during the period of time identified for charging the battery.

In another advantageous embodiment, a charging system comprises a switch, a user interface, a communications unit, a charging management module, and a data management module. The switch is configured to control an electrical connection between a charging device for a battery and a power source. A current flows from the power source through the charging device to the battery to charge the battery when the electrical connection is present between the charging device and the power source. The user interface is in communication with the charging management module. The user interface is configured to receive user input identifying a first portion of information for use in charging the battery. The communications unit is in communication with a charging management module. The communications unit is configured to receive a second portion of the information from an energy management system for use in charging the battery. The information comprises at least one of an available period of time for charging the battery, a charging profile for the battery, a threshold for a level of charge for the battery, an energy cost profile, an energy usage profile, and a number of loads connected to the power source. The charging management module is configured to identify a period of time for charging the battery within the available period of time for charging the battery. The charging management module is further configured to control the switch to electrically connect the charging device for the battery to the power source during the period of time identified for charging the battery. The charging management module is further configured to control the switch to electrically disconnect the charging device from the power source when the level of charge for the battery reaches the threshold. The data management module is configured to store data for use by the charging management module.

In yet another advantageous embodiment, a method for managing charging of a battery is provided. A period of time for charging a battery is identified. A switch to electrically connect a charging device for the battery to a power source is controlled during the period of time identified for charging the battery to form an electrical connection between the charging device and the power source. A current flows from the power source through the charging device to the battery to charge the battery when the electrical connection is present.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 3 is an illustration of information used by a charging management module to select a number of parameters for charging a battery in accordance with an advantageous embodiment;

FIG. 4 is an illustration of a charging system in accordance with an advantageous embodiment;

FIGS. 6A and 6B are illustrations of a flowchart of a process for managing the charging of a battery in a plug-in electric vehicle in accordance with an advantageous embodiment; and FIG. 7 is an illustration of a data processing system in accordance with an advantageous embodiment.

DETAILED DESCRIPTION

Figure 1:
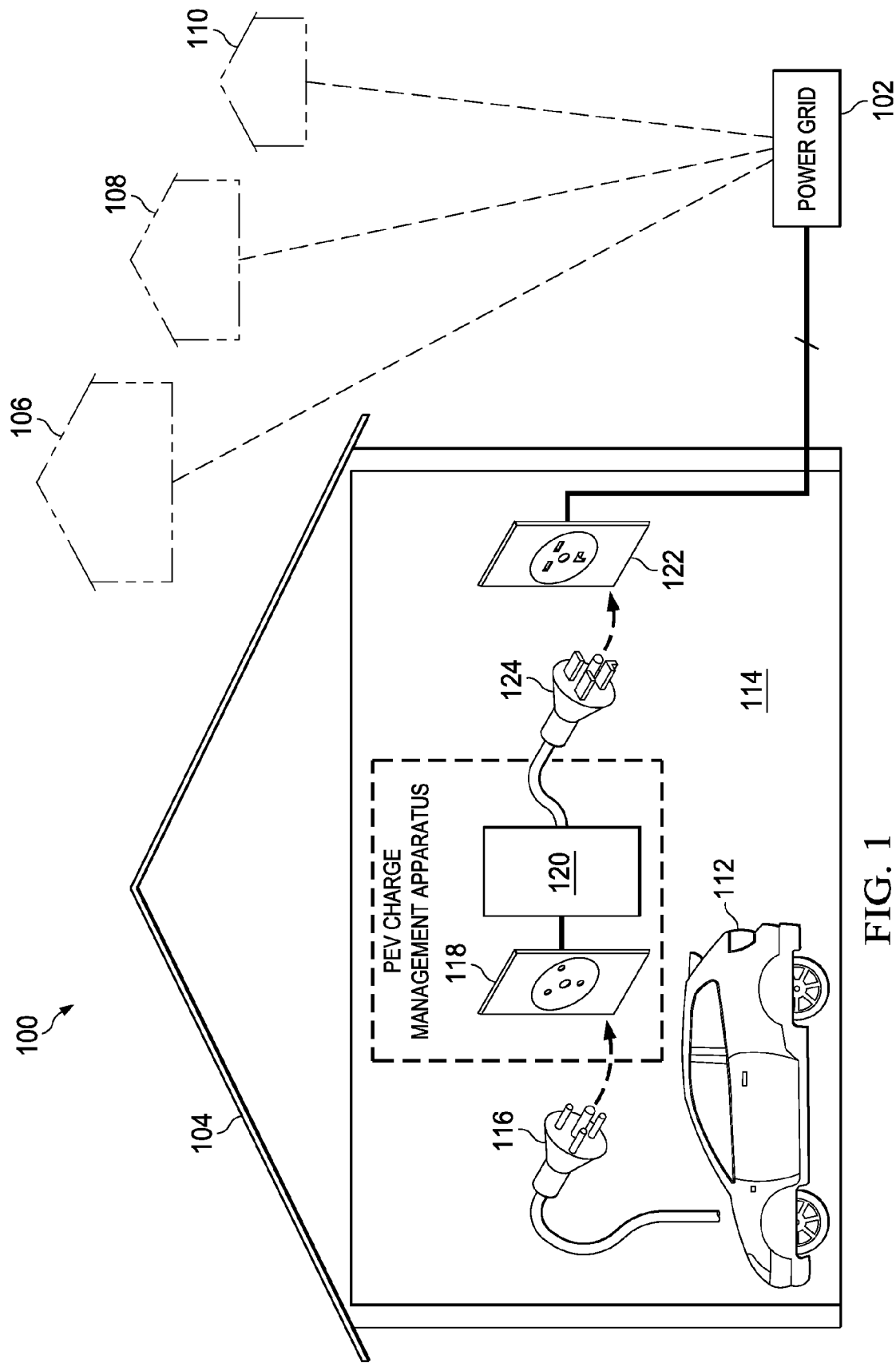
FIG. 1 is an illustration of an energy management environment in accordance with an advantageous embodiment.

The different advantageous embodiments recognize and take into account a number of different considerations. For example, the different advantageous embodiments recognize and take into account that once a battery has been charged to about 100 percent of the capacity for the battery, the current flowing to the battery to charge the battery needs to be dissipated. Typically, the dissipation of this current generates heat and gasses that may cause undesirable effects to the battery.

The different advantageous embodiments recognize and take into account that typically, a rechargeable battery for a device, such as a plug-in electric vehicle, is coupled with a charging device. This charging device may be plugged into or otherwise physically connected to an electrical outlet that is connected to a power source to charge the battery.

When the charging device is plugged into the electrical outlet, current flows from the power source through the charging device and to the battery to charge the battery for the plug-in electric vehicle. The charging device is typically configured to stop charging the battery prior to the battery being fully charged.

The different advantageous embodiments recognize and take into account that the charging device is configured to reduce and/or inhibit the flow of current to the battery to stop charging the battery when the battery has a selected voltage. However, the different advantageous embodiments recognize and take into account that the current flowing from the power source does not stop flowing to the charging device until the charging device is unplugged or otherwise physically disconnected from the electrical outlet connected to the power source.

The different advantageous embodiments also recognize and take into account that allowing current to flow to the charging device when the battery is no longer being charged by the charging device may cause undesired heating of the battery and/or the plug-in electric vehicle. This undesired heating may reduce the life of the battery and/or have other undesired effects on the battery.

Further, the amount of power consumed by the plug-in electric vehicle while the charging device is plugged into the electrical outlet may be more power than is needed for charging the battery for the plug-in electric vehicle. The different advantageous embodiments recognize and take into account that consuming more power than is needed to charge the battery results in a cost for charging the battery that is greater than desired.

Additionally, multiple plug-in electric vehicles and/or other devices may be electrically connected to a same power grid to charge the batteries for these devices. The extra power consumed that is not needed to charge the battery also may increase the load demand on the power more than desired.

Thus, the different advantageous embodiments provide a method and apparatus for managing the charging of a battery. In one advantageous embodiment, an apparatus comprises a switch and a charging management module. The switch is configured to control an electrical connection between a charging device for a battery and a power source. A current flows from the power source through the charging device to the battery to charge the battery when the electrical connection is present between the charging device and the power source. The charging management module is configured to identify a period of time for charging the battery and control the switch to electrically connect the charging device for the battery to the power source during the period of time identified for charging the battery.

With reference to the figures and, in particular, with reference to FIG. 1, an illustration of an energy management environment is depicted in accordance with an advantageous embodiment. In this illustrative example, energy management environment 100 is an environment in which the different advantageous embodiments may be implemented.

As depicted, energy management environment 100 includes power grid 102, residence 104, residence 106, residence 108, residence 110, and vehicle 112. Power grid 102 supplies power to residences 104, 106, 108, and 110 in this depicted example.

In this illustrative example, vehicle 112 is a plug-in electric (PEV) vehicle. Vehicle 112 may be kept in garage 114 of residence 104 when vehicle 112 is not in use. Vehicle 112 may be charged while in garage 114. In particular, a battery in a battery system (not shown) for vehicle 112 may be charged when vehicle 112 is in garage 114.

For example, plug 116 for vehicle 112 may be plugged into connector 118 in charging system 120 to electrically connect vehicle 112 to charging system 120. In this illustrative example, connector 118 is an electrical outlet. As used herein, when a first component, such as vehicle 112, is electrically connected to a second component, such as charging system 120, the first component is connected to the second component so that an electrical signal can be sent from the first component to the second component, the second component to the first component, or a combination of the two.

The first component may be electrically connected to the second component without any additional components between the two components. For example, one electronic device may be electrically connected to a second electronic device without any additional electronic devices between the first electronic device and the second electronic device.

In some cases, the first component may be electrically connected to the second component by one or more other components. For example, another electronic device may be present between the two electronic devices that are electrically connected to each other. In this illustrative example, vehicle 112 is electrically connected to charging system 120 by plug 116 and connector 118.

Further, as illustrated, connector 122 in garage 114 is electrically connected to power grid 102. Plug 124 for charging system 120 may be plugged into connector 122 to electrically connect charging system 120 to power grid 102. As a result, when vehicle 112 is electrically connected to charging system 120 and charging system 120 is electrically connected to power grid 102, vehicle 112 is electrically connected to power grid 102.

When these electrical connections are present, charging system 120 is configured to control the delivery of power to the battery system in vehicle 112. In particular, charging system 120 controls when and how long current is allowed to flow from power grid 102 to the battery system in vehicle 112.

The illustration of energy management environment 100 in FIG. 1 is not meant to imply limitations to the manner in which an advantageous embodiment may be implemented. For example, charging system 120 may be used for a vehicle at an office building, a parking garage at a mall, a commercial location, or some other suitable location.

Figure 2:
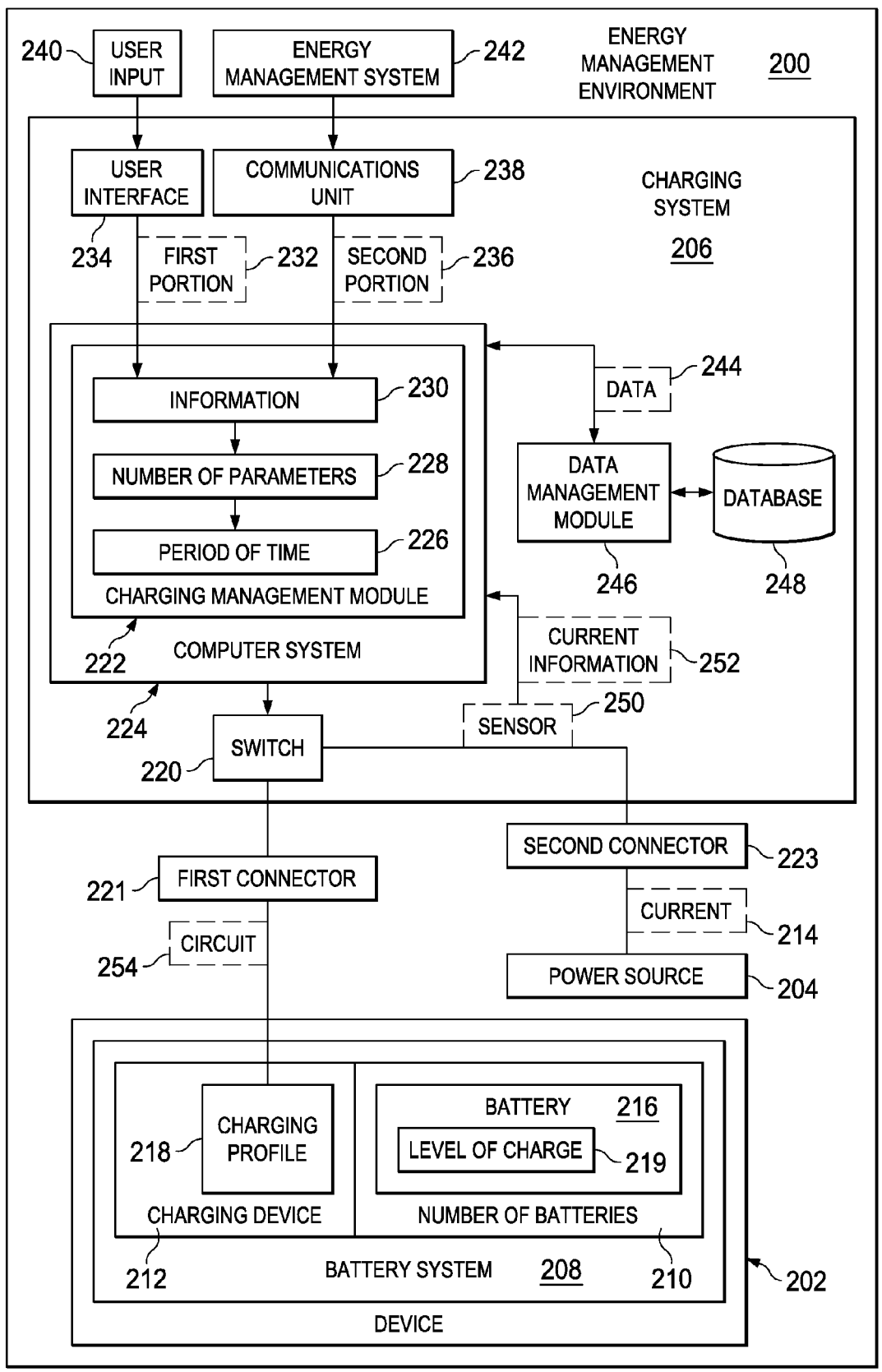
FIG. 2 is an illustration of an energy management environment in accordance with an advantageous embodiment.

With reference now to FIG. 2, an illustration of an energy management environment is depicted in accordance with an advantageous embodiment. Energy management environment 100 in FIG. 1 is an example of one implementation for energy management environment 200 in FIG. 2. In these illustrative examples, energy management environment 200 comprises device 202, power source 204, and charging system 206.

Device 202 has battery system 208. In these illustrative examples, battery system 208 comprises number of batteries 210 and charging device 212. As used herein, a number of items means one or more items. For example, a number of batteries means one or more batteries.

In these examples, device 202 may be any device in which number of batteries 210 in battery system 208 is rechargeable. In these illustrative examples, device 202 may be selected from one of a hybrid vehicle, a cellular phone, a wireless mobile device, a laptop computer, a digital camera, a digital camcorder, a portable electronic device, a battery charger, a field equipment device, a radio communications device, a satellite communications device, an unmanned aerial vehicle, an unmanned ground vehicle, and/or some other suitable type of device.

Charging device 212 is configured to manage the charging of number of batteries 210 in battery system 208. For example, charging device 212 may be electrically connected to power source 204 to charge number of batteries 210. Power source 204 may be, for example, a power grid, a power generator, and/or some other suitable type of power source.

When charging device 212 is electrically connected to power source 204, current 214 flows from power source 204 to charging device 212. Further, current 214 may flow from charging device 212 to number of batteries 210 to charge number of batteries 210. Charging device 212 manages the flow of current 214 to number of batteries 210.

Battery 216 is an example of one of number of batteries 210. Battery 216 may have charging profile 218 stored in charging device 212. Charging profile 218 identifies a voltage at which charging device 212 is to reduce the flow of current 214 flowing to battery 216. Charging device 212 is configured to reduce the flow of current 214 to battery 216 when battery 216 reaches the voltage identified in charging profile 218 for battery 216.

The flow of current 214 to battery 216 may be reduced until current 214 is substantially prevented from flowing to battery 216 in this illustrative example. In other words, charging profile 218 identifies the voltage at which charging device 212 begins to inhibit the flow of current 214 to battery 216.

In these illustrative examples, charging profile 218 may identify level of charge 219 for battery 216. Level of charge 219 may be a percentage of the capacity of battery 216 that has been reached through charging battery 216. For example, when battery 216 is substantially fully charged, level of charge 219 may be about 100 percent. When device 202 is a plug-in electric vehicle or hybrid vehicle, level of charge 219 also may be referred to as a state-of-charge (SOC).

When more than one battery is present in number of batteries 210, these batteries may have the same charging profile and/or different charging profiles. Charging profile 218 for battery 216 may be selected from one of a constant current and constant voltage (CC/CV) profile, a multistate constant current and constant voltage with negative pulse profile, a fixed frequency pulse charging strategy (FFPCS) profile, a variable frequency pulse charging strategy (VFPCS) profile, and/or some other suitable type of charging profile.

In these illustrative examples, the flow of current 214 to charging device 212 is controlled by charging system 206. Charging system 206 comprises switch 220 and charging management module 222. Switch 220 is configured to control an electrical connection between charging device 212 and power source 204. In particular, switch 220 is configured to electrically connect charging device 212 to power source 204 and electrically disconnect charging device 212 from power source 204.

As one illustrative example, switch 220 may be electrically connected to first connector 221 and electrically connected to second connector 223. In these illustrative examples, first connector 221 and second connector 223 may take the form of, for example, without limitation, a two-prong outlet, a three-prong outlet, or some other suitable type of electrical connector.

First connector 221 is configured to be electrically connected to charging device 212 for number of batteries 210. Second connector 223 is configured to be electrically connected to power source 204. Switch 220 is configured to electrically connect first connector 221 and second connector 223 such that charging device 212 may be electrically connected to power source 204 when charging device 212 is connected to first connector 221 and power source 204 is connected to second connector 223.

Switch 220 may be a mechanical switch that physically connects and physically disconnects charging device 212 to and from, respectively, power source 204. As used herein, a first component "physically connected to" a second component means that the first component has direct or indirect physical contact within the second component. The first component is considered to be indirectly physically connected to the second component when one or more additional components that are physically in contact with each other also physically contact the two components. When the first component is directly connected to the second component, no additional components are present between the two components.

In some illustrative examples, switch 220 may be a solid-state switch. For example, switch 220 may be a solid-state device that is configured to control whether current 214 is allowed to flow from power source 204 to charging device 212 when a physical connection is already present between charging device 212 and power source 204. In this manner, switch 220 may be physically connected to charging device 212 for number of batteries 210 and physically connected to power source 204 without forming an electrical connection between charging device 212 and power source 204. This state may be an electrically disconnected state.

In these illustrative examples, two components may be physically connected without being electrically connected. However, the two components may not be electrically connected without being physically connected. In this manner, depending on the implementation, charging device 212 may be electrically disconnected from power source 204 without requiring charging device 212 to be physically disconnected from first connector 221.

For example, first connector 221 may take the form of an electrical outlet and charging device 212 may be physically plugged into first connector 221 to charge number of batteries 210. Charging management module 222 may control switch 220 to electrically disconnect first connector 221 from second connector 223 such that charging device 212 is electrically disconnected from power source 204 without needing charging device 212 to be unplugged from first connector 221.

As a result, charging device 212 does not use or consume power from power source 204 when charging device 212 is electrically disconnected by switch 220. Thus, unneeded use of power from power source 204 may be avoided such that power may be conserved. Also, cost savings may occur when power is not being used when a device is still being electrically connected but not charging a battery.

Charging management module 222 is configured to control switch 220. Charging management module 222 may be implemented using hardware, software, or a combination of the two. For example, charging management module 222 may be implemented in computer system 224. Computer system 224 may take the form of a number of computers. When more than one computer is present in computer system 224, these computers may be in communication with each other.

Charging management module 222 identifies period of time 226 for charging number of batteries 210. Period of time 226 may be, for example, a number of minutes, a number of hours, a number of different intervals of time, or some other suitable period of time. In this manner, period of time 226 may be a continuous period of time or a discontinuous period of time.

Charging management module 222 is configured to control switch 220 to electrically connect charging device 212 to power source 204 during period of time 226 to charge number of batteries 210 during period of time 226. When period of time 226 is a discontinuous period of time comprising multiple discontinuous intervals of time, charging management module 222 controls switch 220 to electrically connect charging device 212 to power source 204 only during the multiple discontinuous intervals of time. Further, charging management module 222 is configured to electrically disconnect charging device 212 from power source 204 after period of time 226.

In these illustrative examples, charging management module 222 may identify period of time 226 for charging number of batteries 210 using number of parameters 228 for charging number of batteries 210. Charging management module 222 may select number of parameters 228 for charging number of batteries 210 based on information 230 about number of batteries 210, power source 204, and current 214 flowing from power source 204.

Number of parameters 228 may include, for example, a desired cost for charging number of batteries 210 to reach a threshold for a level of charge for number of batteries 210, a limit for the amount of power being consumed from power source 204 at any given point in time, a limit for the number of loads electrically connected to power source 204 at any given point in time, a number of intervals of time at which current 214 is not to be allowed to flow to battery system 208, and/or other suitable types of parameters.

Charging management module 222 may be configured to obtain information 230 in a number of different ways. In these illustrative examples, charging management module 222 may be configured to receive first portion 232 of information 230 from user interface 234 and second portion 236 of information 230 from communications unit 238. In this illustrative example, a portion of information 230 may be none, some, or all of information 230.

As depicted, user interface 234 is configured to receive user input 240. User input 240 may identify first portion 232 of information 230. User interface 234 sends first portion 232 of information 230 to charging management module 222 for use in selecting number of parameters 228 for charging number of batteries 210. In some illustrative examples, user input 240 may identify one or more of number of parameters 228 to be used in identifying period of time 226 for charging number of batteries 210.

Further, communications unit 238 is configured to receive second portion 236 of information 230. Second portion 236 of information 230 may be received from, for example, without limitation, energy management system 242.

Energy management system 242 may comprise any number of components configured to manage the delivery of power from power source 204. For example, energy management system 242 may comprise a number of power grids, a number of smart grids, a number of power meters, a number of power generators, a number of controllers, a number of switches, and/or any other number of components involved in the generation and delivery of power from power source 204.

In these illustrative examples, communications unit 238 may comprise any number of devices configured to receive second portion 236 of information 230 using a wireless communications link and send second portion 236 of information 230 to charging management module 222. As one illustrative example, communications unit 238 may comprise an antenna configured to receive electromagnetic waves containing second portion 236 of information 230 and a receiver configured to send second portion 236 of information 230 to charging management module 222.

Additionally, charging management module 222 may be configured to send information 230 received from user interface 234, communications unit 238, and/or other suitable information in the form of data 244 to data management module 246 in charging system 206. Data management module 246 is configured to store data 244 in database 248. In some illustrative examples, data management module 246 may be configured to analyze data 244 and store reports generated from this analysis in database 248 along with data 244.

In these illustrative examples, charging system 206 also may include sensor 250. Sensor 250 is configured to measure current 214 flowing from power source 204 at a location between power source 204 and switch 220 to form current information 252.

Charging management module 222 may use current information 252 to identify charging profile 218 for one or more of number of batteries 210. For example, when charging device 212 is charging battery 216, charging management module 222 uses current information 252 to identify when the flow of current 214 to charging device 212 is reduced to identify charging profile 218 for battery 216.

As depicted, charging management module 222 also may include circuit 254. Circuit 254 is configured to detect when charging device 212 is not electrically connected to first connector 221. When circuit 254 detects that charging device 212 is not electrically connected to first connector 221, charging management module 222 is configured to electrically disconnect first connector 221 from second connector 223.

In this manner, charging management module 222 is configured to control the flow of current to charging device 212 in battery system 208 compared to currently-available systems that only control the flow of current to number of batteries 210 from charging device 212. With currently-available systems, charging device 212 may stop charging number of batteries 210 but may continue to receive current 214 from power source 204 until charging device 212 is physically disconnected from power source 204.

Charging management module 222 allows the flow of current 214 to charging device 212 from power source 204 to be stopped using switch 220 to reduce the total amount of power consumed by charging device 212 when charging number of batteries 210, as compared to currently-available systems.

Further, charging system 206 may be used in a number of different locations. For example, charging system 206 may be used in at least one of a residence, a commercial location, an office building, a restaurant, a parking garage at a mall, a space station, an underwater station, an aerospace vehicle, a water-based vehicle, a satellite station, and/or some other suitable type of location.

As used herein, the phrase "at least one of", when used with a list of items, means different combinations of one or more of the listed items may be used and only one of each item in the list is needed. For example, "at least one of item A, item B, and item C" may include, for example, without limitation, item A or item A and item B. This example also may include item A, item B, and item C, or item B and item C.

With reference now to FIG. 3, an illustration of information used by a charging management module to select a number of parameters for charging a battery is depicted in accordance with an advantageous embodiment. In this illustrative example, information 230 from FIG. 2 is depicted in more detail in the form of a block diagram.

In FIG. 3, information 230 may include, for example, without limitation, at least one of available period of time 300 for charging number of batteries 210 in FIG. 2, threshold 302 for a level of charge for number of batteries 210, energy cost profile 304, energy usage profile 306, number of loads 308, and charging profile 218. Of course, in other illustrative examples, other types of information may be included in information 230 in addition to and/or in place of the information listed.

Available period of time 300 for charging number of batteries 210 is the period of time available for charging number of batteries 210. For example, available period of time 300 may be a pre-selected amount of time during which charging device 212 will be electrically connected to first connector 221 in FIG. 2.

As one illustrative example, available period of time 300 may be identified in user input 240 entered by a user at user interface 234 in FIG. 2. For example, the user of device 202 may indicate how long the user will leave device 202 connected to charging system 206 in FIG. 2. In some illustrative examples, available period of time 300 may be identified in a schedule for charging number of batteries 210 received in user input 240. Charging management module 222 is configured to identify period of time 226 from within available period of time 300.

Threshold 302 for a level of charge for number of batteries 210 may be for one or more of number of batteries 210. As one illustrative example, threshold 302 may be for level of charge 219 for battery 216 in FIG. 2. Threshold 302 may be, for example, without limitation, about 70 percent, about 80 percent, about 90 percent, about 95 percent, or some other percentage of the total capacity for battery 216. Further, threshold 302 may be identified in user input 240. For example, the user of device 202 may desire that battery 216 only be charged to about 90 percent.

Energy cost profile 304 may be identified in information received from energy management system 242 through communications unit 238 in FIG. 2. Energy cost profile 304 provides data about the cost of power being delivered from power source 204 in FIG. 2. For example, energy cost profile 304 may identify the cost per unit of power delivered from power source 204. Further, energy cost profile 304 may identify, for example, trends in the fluctuations in the cost per unit of power over the course of a day or a week.

Energy usage profile 306 also may be identified in information received from energy management system 242 through communications unit 238. Energy usage profile 306 identifies the amount of power being delivered from power source 204 over time. For example, when device 202 is a vehicle being charged at a residence, energy usage profile 306 may identify the amount of power being delivered to device 202 and a number of other devices electrically connected to power source 204 at the residence over time. In other words, energy usage profile 306 may identify the overall energy usage at the residence over time.

In these illustrative examples, number of loads 308 is the number of loads electrically connected to power source 204. Number of loads 308 in information 230 may provide the number of loads electrically connected to power source 204 over time. In other words, this information may indicate changes to the number of loads electrically connected to power source 204 over time.

Further, charging profile 218 also may be included in information 230. As one illustrative example, a user may enter user input 240 at user interface 234 identifying charging profile 218 for battery 216. In this manner, charging management module 222 may not need to use current information 252 to identify charging profile 218.

The illustrations of energy management environment 200 in FIG. 2 and information 230 in FIG. 3 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, charging system 206 may have switches in addition to switch 220. Charging management module 222 may be configured to control the additional switches to form electrical connections between power source 204 and charging devices in other devices in addition to device 202.

In other illustrative examples, additional components may be present between charging device 212 and switch 220 in addition to first connector 221. For example, additional plugs and/or electrical outlets may electrically connect charging device 212 to switch 220 in addition to first connector 221.

In still other illustrative examples, additional power sources may be electrically connected to switch 220 in addition to power source 204. For example, switch 220 may be configured to control from which of these multiple sources current is allowed to flow to charging device 212 to charge number of batteries 210.

Additionally, in some cases, one or more computers in computer system 224 may be in locations remote to switch 220. In one illustrative example, user interface 234 may be implemented in one or more of the computers in computer system 224 in a location remote to the location of switch 220.

With reference now to FIG. 4, an illustration of a charging system is depicted in accordance with an advantageous embodiment. In this illustrative example, charging system 400 is an example of one implementation for charging system 206 in FIG. 2. In particular, charging system 400 may be an example of one implementation for charging system 120 in FIG. 1.

As depicted, charging system 400 comprises switch 402, charging management module 404, user interface 406, communications unit 408, data management module 410, and sensor 412. In this illustrative example, switch 402 is electrically connected to connector 414 and connector 416. Connector 414 and/or connector 416 may be considered part of charging system 400 in some illustrative examples.

Connector 414 is configured to be electrically connected to a device, such as, for example, device 202 in FIG. 2. As one illustrative example, connector 414 may be configured to be electrically connected to vehicle 112 in FIG. 1. For example, connector 414 may be connector 118 in FIG. 1.

Further, connector 416 is configured to be electrically connected to a power source, such as power source 204 in FIG. 2. As one illustrative example, connector 416 may be configured to be electrically connected to power grid 102 in FIG. 1. For example, connector 416 may be connector 122 in FIG. 1.

In this illustrative example, switch 402 is a mechanical switch that controls an electrical connection between connector 414 and connector 416. In particular, switch 402 controls a physical connection between these two connectors. For example, when switch 402 physically connects connector 414 and connector 416, these connectors become electrically connected. When switch 402 physically disconnects connector 414 from connector 416, these connectors become electrically disconnected.

Charging management module 404 is configured to control the operation of switch 402. Charging management module 404 may control switch 402 to electrically connect connector 414 and connector 416 for a period of time identified by charging management module 404. This period of time may be identified using information received from at least one of user interface 406, communications unit 408, and data management module 410.

User interface 406 is configured to receive user input entered by a user of the device being connected to charging system 400 or some other suitable user. Communications unit 408 is configured to receive information from an energy management system, such as energy management system 242 in FIG. 2, and/or other suitable sources of information.

In this illustrative example, communications unit 408 comprises antenna 418 and transceiver 420. Antenna 418 may be configured to receive electromagnetic waves containing information. For example, antenna 418 may be configured to receive electromagnetic waves transmitted from the energy management system. Further, transceiver 420 is configured to send the information contained in the electromagnetic waves in response to antenna 418 receiving the electromagnetic waves to charging management module 404.

Transceiver 420 may comprise a receiver and a transmitter in this illustrative example. In some cases, charging management module 404 may be configured to send information to transceiver 420 in communications unit 408 such that the information may be transmitted from antenna 418 in electromagnetic waves.

The information transmitted may be, for example, performance data, operational data, and/or other suitable information. In some cases, the information transmitted may be data received from data management module 410.

Data management module 410 is configured to store data received from charging management module 404. This data may include, for example, operational data, performance data, information received from user interface 406, information received through communications unit 408, and/or other suitable information.

In this illustrative example, sensor 412 is configured to measure the current flowing from connector 414 to switch 402 to form current information. This current information may be sent to charging management module 404. Charging management module 404 may use this current information to identify a charging profile for a battery electrically connected to connector 414.

The illustration of charging system 400 in FIG. 4 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, communications unit 408 may not include antenna 418 and/or transceiver 420. As one illustrative example, communications unit 408 may have a receiver instead of transceiver 420. In this manner, communications unit 408 may only be configured to receive and not transmit information.

In other illustrative examples, one or more of user interface 406, communications unit 408, data management module 410, and sensor 412 may not be present in charging system 400. For example, charging system 400 may only include switch 402, charging management module 404, and user interface 406 in some illustrative examples.

Figure 5:
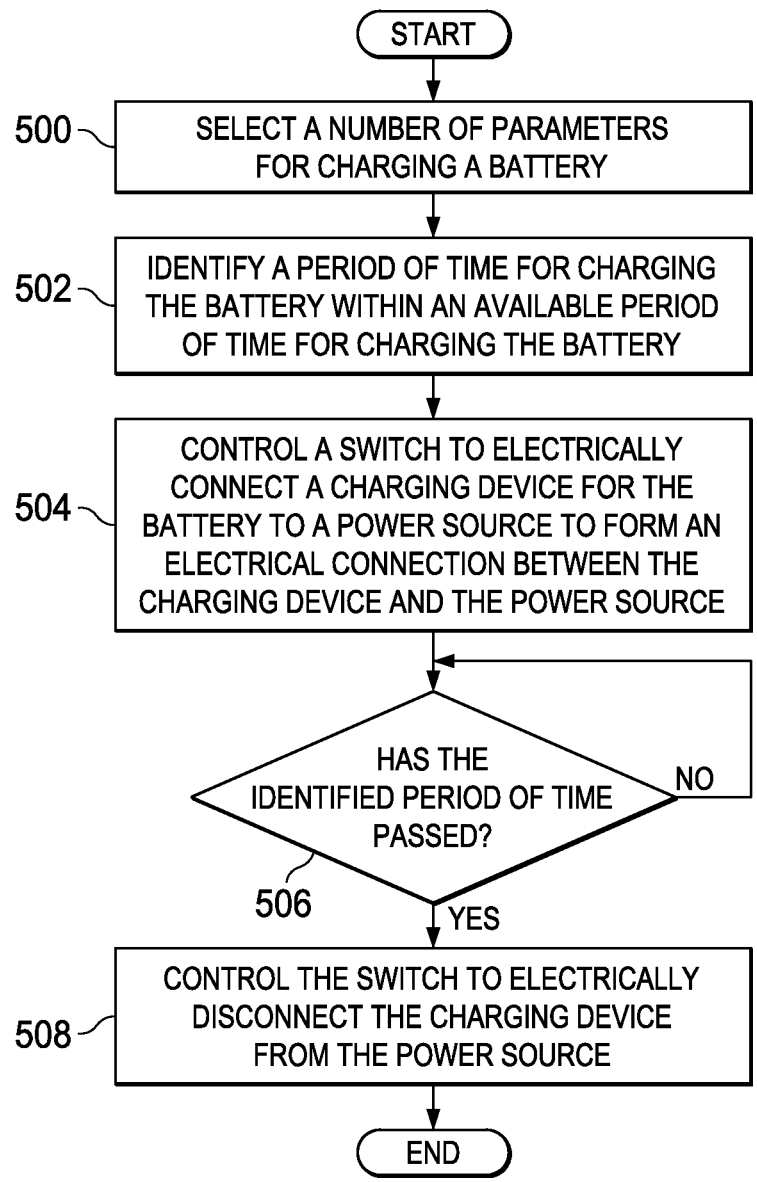
FIG. 5 is an illustration of a flowchart of a process for managing the charging of a battery in accordance with an advantageous embodiment.

With reference now to FIG. 5, an illustration of a flowchart of a process for managing the charging of a battery is depicted in accordance with an advantageous embodiment. The process illustrated in FIG. 5 may be implemented using charging system 206 in FIG. 2. In particular, this process may be implemented using charging management module 222 in FIG. 2.

The process begins by selecting a number of parameters for charging a battery (operation 500). Operation 500 may be performed using information received from at least one of a user interface, a communications unit, and a data management module.

The information may include, for example, an available period of time for charging, an energy cost profile, an energy usage profile, a charging profile for the battery, and/or other suitable information. The number of parameters selected in operation 500 may include, for example, a desired cost for charging the battery to reach a threshold for a level of charge for the battery.

The process then identifies a period of time for charging the battery within an available period of time for charging the battery (operation 502). Next, the process controls a switch to electrically connect a charging device for the battery to a power source to form an electrical connection between the charging device and the power source (operation 504). When this electrical connection is present, current flows from the power source through the charging device to the battery to charge the battery.

The process then determines whether the period of time identified for charging the battery has passed (operation 506). If the period of time has passed, the process controls the switch to electrically disconnect the charging device from the power source (operation 508), with the process terminating thereafter. Otherwise, the process returns to operation 506 as described above.

With reference now to FIGS. 6A and 6B, illustrations of a flowchart of a process for managing the charging of a battery in a plug-in electric vehicle is depicted in accordance with an advantageous embodiment. The process illustrated in FIGS. 6A and 6B may be implemented using charging system 206 in FIG. 2. In particular, this process may be implemented using charging management module 222 in charging system 206 in FIG. 2.

The process begins by determining whether a switch in the charging system is in a proper configuration (operation 600). The switch is electrically connected to a first connector. At any point in time, a charging device for a battery in a plug-in electric vehicle may be plugged into the first connector to electrically connect the charging device and the switch.

Further, the switch is electrically connected to a second connector. The switch may be plugged into the second connector to electrically connect the switch and the power source.

The switch is configured to electrically connect the first connector to the second connector in a first configuration. In other words, the switch is turned on in the first configuration. Further, the switch is configured to electrically disconnect the first connector from the second connector in the second configuration. In other words, the switch is turned off in the second configuration.

In this manner, when the charging device is plugged into the first connector, the switch is plugged into the second connector and the switch is in the first configuration, the charging device is electrically connected to the power source. In other words, current may flow from the power source through the charging device to the battery to charge the battery in the plug-in electric vehicle.

However, when the charging device is plugged into the first connector and the switch is plugged into the second connector, but the switch is in the second configuration, the charging device is electrically disconnected from the power source. In other words, current is not allowed to flow from the power source through the charging device to the battery.

As a result, if the charging system is not supposed to be allowing current to flow from the power source to the charging device, the proper configuration for the switch is the second configuration. In other words, the switch should be turned off. If the charging system is supposed to allow current to flow from the power source to the charging device, the proper configuration for the switch is the first configuration. In other words, the switch should be turned on.

If the switch is in the proper configuration, the process checks user input being received from a user interface (operation 602). The user input may include a selection of a setting for the charging management module in the charging system. The setting selected in the user input may be one of a first setting, a second setting, and a third setting.

A selection of the second setting in the user input also includes a scheduled time for charging the battery in the user input. The scheduled time may be, for example, a time after some selected period of time during which the charging device for the battery in the plug-in-electric vehicle has been plugged into the connector. The scheduled time also may be one hour after the electrical connection between the charging device for the battery in the plug-in electric vehicle and the connector has been established.

A selection of the third setting in the user input also includes an available period of time for charging the battery in the user input. The available period of time for charging the battery may be, for example, a number of hours during which the charging device will remain plugged into the connector.

Next, the process determines whether an electrical connection between the charging device for the battery in the plug-in electric vehicle and the connector is present (operation 604). If the electrical connection between the charging device and the connector is present, the process determines whether the first setting, the second setting, or the third setting has been selected in the user input (operation 606).

If the first setting has been selected, the process controls the switch to turn the switch on (operation 608). When the switch is turned on, the charging device for the battery in the plug-in electric vehicle is electrically connected to the power source. Thereafter, the process determines whether a threshold for the level of charge for the battery has been specified (operation 610). The threshold may be specified in the user input, for example.

If a threshold for the level of charge for the battery has not been specified, the process records the data (operation 612) and returns to operation 600 as described above. The data recorded in operation 612 may include, for example, without limitation, performance characteristics, values for operational parameters for the charging management module, a level of voltage for the battery, measured current, and/or other suitable types of data.

With reference again to operation 610, if a threshold for the level of charge for the battery has been specified, the process monitors the current flowing from the power source to the battery in the plug-in electric vehicle and calculates a current level of charge for the battery (operation 614). Next, the process determines whether the current level of charge for the battery is less than the threshold (operation 616).

If the current level of charge for the battery is less than the threshold, the process returns to operation 612 as described above. Otherwise, if the current level of charge for the battery is substantially equal to or greater than the threshold, the process controls the switch to turn the switch off (operation 618), with the process then terminating.

With reference again to operation 606, if the second setting has been selected, the process controls the switch to turn the switch on at the scheduled time for charging the battery in the plug-in electric vehicle (operation 620). Thereafter, the process proceeds to operation 610 as described above.

With reference again to operation 606, if the third setting has been selected, the process obtains an energy cost profile from a communications unit (operation 622). The process then identifies a period of time for charging the battery within the available period of time for charging the battery based on the energy cost profile and/or other suitable information (operation 624).

In operation 624, the other suitable information may be received from the user interface and/or the communications unit. For example, the other information may include user specifications received from the user interface indicating a maximum desired cost for charging the battery.

Further, in operation 624, the period of time may be, for example, a continuous period of time or a discontinuous period of time. For example, the period of time may comprise multiple discontinuous intervals of time.

Thereafter, the process controls the switch to turn the switch on during the period of time (operation 626). If the period of time comprises multiple discontinuous intervals of time, the switch is only turned on during the intervals and is turned off between the intervals. The process then proceeds to operation 610 as described above.

With reference again to operation 604, if an electrical connection between the charging device for the battery in the plug-in electric vehicle and the connector is not present, the process monitors for the electrical connection (operation 628). When the electrical connection is detected, the process proceeds to operation 606 as described above.

Further, with reference again to operation 600, if the switch is not in the proper configuration, the process controls the switch to change the configuration for the switch to the proper configuration (operation 630). The process then proceeds to operation 602 as described above.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, operation 622 may be performed at the same time as operation 602. Further, in operation 602, information containing the energy cost profile may be received from the communications unit at the same time that user input is received from the user interface.

Turning now to FIG. 7, an illustration of a data processing system is depicted in accordance with an advantageous embodiment. In this illustrative example, data processing system 700 may be used to implement one or more of computer system 224 in FIG. 2. Data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708.

Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different advantageous embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications fabric 702.

Thus, the different advantageous embodiments provide a method and apparatus for managing the charging of a battery. In one advantageous embodiment, an apparatus comprises a switch and a charging management module. The switch is configured to control an electrical connection between a charging device for a battery and a power source. A current flows from the power source through the charging device to the battery to charge the battery when the electrical connection is present between the charging device and the power source. The charging management module is configured to identify a period of time for charging the battery and to control the switch to electrically connect the charging device for the battery to the power source during the period of time identified for charging the battery.

In this manner, the different advantageous embodiments provide a charging system that reduces an overall amount of power consumed by the charging device for a battery. As a result, a total cost for the power may be reduced. Further, when multiple charging systems implemented according to the different advantageous embodiments are used for charging multiple devices, such as, for example, plug-in electric vehicles, the overall peak-to-average ratio for the power grid supplying power to these devices may be reduced.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a switch configured to control an electrical connection between a charging device and a power source, wherein a current flows from the power source through the charging device to a battery to charge the battery when the electrical connection is present between the charging device and the power source; and
    a charging management module configured: to identify a period of time for charging the battery to control the switch to electrically connect the charging device to the power source during the period of time for charging the battery; and, based upon a number of loads electrically connected to the power source, disconnect the charging device from the power source.

2. The apparatus of claim 1, wherein the charging management module is configured to: select a number of parameters for charging the battery, and to identify the period of time for charging the battery using the number of parameters for charging the battery.

3. The apparatus of claim 2, further comprising:
    a user interface configured to receive user input identifying information for use in selecting the number of parameters for charging the battery, wherein the information comprises at least one of an available period of time for charging the battery, a charging profile for the battery, a threshold for a level of charge comprised by the battery, and an energy cost profile; such that the charging profile comprises at least one profile selected from a group of profiles consisting of: a constant current and constant voltage profile, a multistate constant current and constant voltage with negative pulse profile, a fixed frequency pulse charging strategy profile, a variable frequency pulse charging strategy profile.

4. The apparatus of claim 2, further comprising:
    a communications unit in communication with the charging management module and configured to receive information from an energy management system for use in selecting the number of parameters for charging the battery, wherein the information comprises at least one of an available period of time for charging the battery, a charging profile for the battery, a threshold for a level of charge comprised by the battery, an energy cost profile, and an energy usage profile.

5. The apparatus of claim 1, wherein the charging management module is further configured to control the switch to electrically disconnect the charging device from the power source when a level of charge comprised by the battery reaches a threshold.

6. The apparatus of claim 1, further comprising:
a data management module configured to store data, wherein the charging management module is configured to use the data to charge the battery.

7. The apparatus of claim 1, wherein the period of time is a first period of time and is identified from within a second period of time available for charging the battery.

8. The apparatus of claim 1, further comprising:
a sensor configured to: measure the current at a location between the power source and the switch, and form current information, wherein the charging management module is configured to use the current information to identify a charging profile for the battery that identifies a voltage at which the charging device reduces a flow of the current to the battery; such that the charging profile comprises at least one profile selected from a group of profiles consisting of: a constant current and constant voltage profile, a multistate constant current and constant voltage with negative pulse profile, a fixed frequency pulse charging strategy profile, a variable frequency pulse charging strategy profile.

9. The apparatus of claim 1, further comprising:
a first connector configured to be electrically connected to the switch and the charging device; and
a second connector configured to be electrically connected to the switch and the power source, wherein the switch controls the electrical connection between the first connector and the second connector to electrically connect the power source to the charging device.

10. The apparatus of claim 9, further comprising:
a circuit configured to detect when the charging device is not electrically connected to the first connector, wherein the charging management module is further configured to control the switch to electrically disconnect the first connector from the second connector when the charging device is not electrically connected to the first connector.

11. The apparatus of claim 1, wherein the battery is for a device selected from one of a plug-in electric vehicle, a hybrid vehicle, a cellular phone, a wireless mobile device, and a laptop computer.

12. A charging system comprising:
a switch configured to control an electrical connection between a charging device and a power source, wherein a current flows from the power source through the charging device to a battery to charge the battery when the electrical connection is present between the charging device and the power source;
a charging management module configured to: identify a period of time for charging the battery within an available period of time for charging the battery based on information comprising at least one of: the available period of time for charging the battery, a charging profile for the battery, a threshold for a level of charge comprised by the battery, an energy cost profile, an energy usage profile, and a number of loads connected to the power source; control the switch to electrically connect the charging device to the power source during the period of time identified for charging the battery; control the switch to electrically disconnect the charging device from the power source when the level of charge comprised by the battery reaches the threshold; and, based upon a number of loads electrically connected to the power source, disconnect the charging device from the power source; and
a data management module configured to store data for use by the charging management module.

13. A method for managing charging of a battery, the method comprising:
identifying a period of time for charging the battery; and
controlling a switch to: electrically connect a charging device to a power source during the period of time identified for charging the battery to form an electrical connection between the charging device and the power source, wherein a current flows from the power source through the charging device to the battery to charge the battery when the electrical connection is present; and, based upon a number of loads electrically connected to the power source, disconnect the charging device from the power source, the number of loads being received by a charging management module.

14. The method of claim 13, further comprising:
selecting a number of parameters for charging the battery; and
identifying the period of time for charging the battery using the number of parameters for charging the battery.

15. The method of claim 14, further comprising:
receiving user input from a user interface, wherein the user input identifies information for use in selecting the number of parameters for charging the battery in which the information comprises at least one of an available period of time for charging the battery, a charging profile for the battery, a threshold for a level of charge comprised by the battery, and an energy cost profile, such that the charging profile comprises at least one profile selected from a group of profiles consisting of: a constant current and constant voltage profile, a multistate constant current and constant voltage with negative pulse profile, a fixed frequency pulse charging strategy profile, a variable frequency pulse charging strategy profile.

16. The method of claim 14, further comprising:
receiving information from an energy management system for use in selecting the number of parameters for charging the battery, wherein the information comprises at least one of an available period of time for charging the battery, a charging profile for the battery, a threshold for a level of charge comprised by the battery, an energy cost profile, an energy usage profile, and a number of loads connected to the power source.

17. The method of claim 13, further comprising:
controlling the switch to electrically disconnect the charging device from the power source when a level of charge comprised by the battery reaches a threshold.

18. The method of claim 13, further comprising:
storing data in a database, wherein the data is used to identify the period of time for charging the battery.

19. The method of claim 13, further comprising:
measuring the current at a location between the power source and the switch to form current information; and
creating a charging profile for the battery that identifies a voltage at which the charging device reduces a flow of the current to the battery using the current information, such that the charging profile comprises at least one profile selected from a group of profiles consisting of: a constant current and constant voltage profile, a multistate constant current and constant voltage with negative pulse profile, a fixed frequency pulse charging strategy profile, a variable frequency pulse charging strategy profile.

20. The method of claim 13, wherein the battery is for a device selected from one of a plug-in electric vehicle, a hybrid vehicle, a cellular phone, a wireless mobile device, and a laptop computer.

* * * * *